US005373283A

United States Patent [19]

Maharshak

[11] Patent Number: 5,373,283

[45] Date of Patent: Dec. 13, 1994

[54] ALARM SYSTEM FOR A CARD HOLDER

[76] Inventor: Arie Maharshak, P.O. Box 135, Shave Zion 25227, Israel

[21] Appl. No.: 821,638

[22] Filed: Jan. 16, 1992

[30] Foreign Application Priority Data

Jan. 30, 1991 [IL] Israel .................................. 097.097

[51] Int. Cl.[5] .............................................. C08B 13/14

[52] U.S. Cl. .................................. 340/568; 200/61.19

[58] Field of Search ........................ 340/571, 568, 522; 200/61.19; 150/147-149

[56] References Cited

U.S. PATENT DOCUMENTS

| | | | |
|---|---|---|---|
| 2,708,747 | 5/1955 | Moon | 340/568 |
| 3,648,832 | 3/1972 | Kirshenbaum et al. | 206/37 |
| 3,930,249 | 12/1975 | Steck et al. | 340/571 |
| 3,959,789 | 5/1976 | McGahee | 340/568 X |
| 4,242,670 | 12/1980 | Smith | 340/568 |
| 4,480,250 | 10/1984 | McNeely | 340/568 |
| 4,584,571 | 4/1986 | Smit et al. | 340/572 |
| 4,652,865 | 3/1987 | Maharshak | 340/568 |
| 4,692,745 | 9/1987 | Simanowitz | 340/568 |
| 4,717,908 | 1/1988 | Phillips et al. | 340/568 |
| 4,719,453 | 1/1988 | Beck et al. | 340/568 |
| 4,721,948 | 1/1988 | Lin | 340/568 |
| 4,890,094 | 12/1989 | Kopel | 340/571 |
| 4,916,434 | 4/1990 | McNeely | 340/568 |
| 5,053,749 | 10/1991 | Weiss | 340/568 |

FOREIGN PATENT DOCUMENTS

| | | | |
|---|---|---|---|
| 4656885 | 8/1985 | Australia . | |
| 2643480 | 8/1990 | France | 340/568 |
| 68801 | of 1986 | Israel . | |
| 034418 | 8/1986 | Taiwan, Prov. of China . | |

*Primary Examiner*—John K. Peng
*Assistant Examiner*—Thomas J. Mullen, Jr.
*Attorney, Agent, or Firm*—Frishauf, Holtz, Goodman & Woodward

[57] ABSTRACT

A cardholder with an alarm includes a control circuit to prevent operation of the alarm until the cardholder is folded up or closed. The control circuit is preferably an interrupted loop of conductive material on the exterior of one or more flexible pockets of the cardholder and a conductive member, which may be part of the loop, on an adjacent pocket or pockets which closes or bridges the gap in the interrupted loop when adjacent pockets are placed into overlying relationship such as by folding the cardholder.

35 Claims, 5 Drawing Sheets

ALARM SYSTEM FOR A CARD HOLDER

BACKGROUND OF THE INVENTION

I. Field of the Invention

The present invention relates to an alarmed cardholder and more specifically to a cardholder having a plurality of pockets and equipped with circuitry to cause an audible or visible alarm to be emitted if a card which had been withdrawn has not been returned to its pocket.

II. Description of the Prior Art

Cardholders having alarm circuitry are described in my Israeli Patent No. 68801 and U.S. Pat. No. 4,652,865 as having a plurality of flexible pockets wherein conductors are fastened to the inside of the pockets and connected to an alarm circuit. Withdrawal of a card from a pocket allows the conductors in that pocket to come into contact thereby closing an electrical circuit and initiating a timer in the alarm circuit. If the circuit is not interrupted, i.e., the card is not returned to the pocket within a fixed period of time, the alarm circuit causes an alarm to be emitted. While such a cardholder alerts the user to absence of a card from a pocket, the alarm may be given before the user has finished using the card if the card is not returned to the cardholder before the period of time has elapsed. Thus, a signal may be caused to be emitted while the cardholder is still in the hand of the owner and before the owner closes the cardholder up and returns it to a pocket, wallet, or handbag.

SUMMARY OF THE INVENTION

The present invention provides an alarm control system for a cardholder. To this end, and in accordance with one aspect of the present invention, alarm control is provided by a circuit mounted on the exterior wall of at least one of the flexible pockets of the cardholder and either another pocket or an end cover such as might contain the alarm circuit. The control circuit interrupts the connection of the card conductors within the pockets to the alarm circuit thereby preventing emission of the alarm unless the two pockets (or the pocket and end cover) are placed into overlying relationship with one another. In accordance with another aspect of the present invention, the control circuit includes a conductor on the pocket exterior wall and in series between the card conductors within the pockets and the alarm circuit and is interrupted at a gap to prevent completion of the connection to the alarm circuit. The control circuit further includes a second conductor on another wall such as the wall of another pocket (or the end cover) and positioned to bridge the gap when the two pockets, for example, are placed in overlying relationship. Preferably, the two conductors are disposed on exterior walls of a pair of adjacent pockets. By virtue of the foregoing, the alarm circuit is enabled only when the two pockets are in overlying relationship such that no alarm can be given when the two pockets are opened one from the other.

Other objects and advantages of the present invention shall become apparent from the following description of the invention.

BRIEF DESCRIPTION OF THE DRAWINGS

The accompanying drawings, which are incorporated in and constitute a part of this specification, illustrate the invention and, together with the general description of the invention given above, and the detailed description given below, serve to explain the principles of the present invention.

DETAILED DESCRIPTION OF THE DRAWINGS

Figure 1:
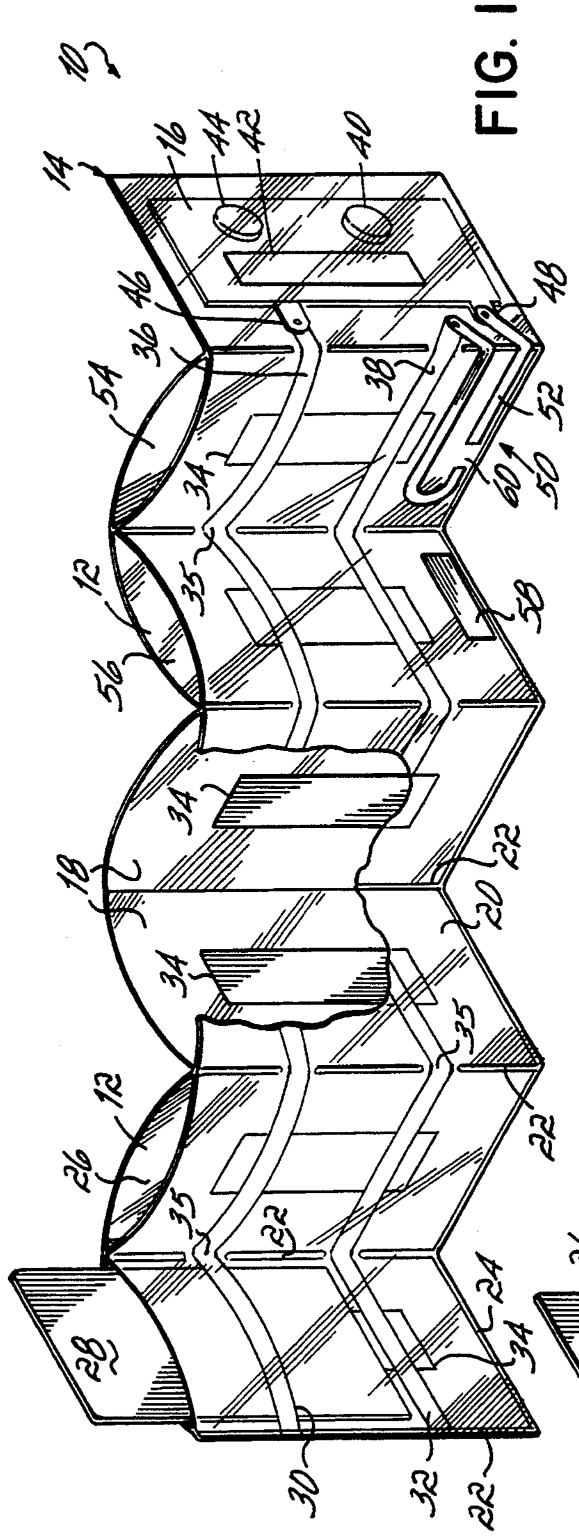
FIG. 1 is a perspective view, partially cut-away, of a first embodiment of a cardholder with an alarm control circuit in accordance with the principles of the present invention.

With reference to FIG. 1, there is illustrated a first embodiment of a cardholder 10 in accordance with the principles of the present invention. Cardholder 10 includes several, such as six, flexible pockets 12 (shown wide open) and an end cover 14 containing alarm circuit 16. Pockets 12 are defined by two continuous strips 18 and 20 of plastic, preferably transparent, material, which are interconnected by transverse seams 22 and a continuous bottom seam 24 to define the rear and front walls, respectively, of the pockets and top opening 26 for insertion and removal of a card 28 such as a credit card. Adjacent pairs of pockets 12 are interconnected at transverse seams 22 to connect the pockets in accordion fashion.

To detect absence of card 28 from a pocket 12, each pocket is provided with two substantially parallel and continuous conductor strips 30 and 32 attached to the inside of front wall 20, and a transverse conductor plate 34 attached to the inside of rear wall 18 opposite conductors 30 and 32. It should be noted that transverse seams 22 are interrupted as at 35 in the region of conductors 30 and 32 as they pass through the fold created at the seam so as not to disrupt or break conductors 30 and 32. Plate 34 is sized and positioned to overlap conductor strips 30 and 32 when walls 18 and 20 of a pocket 12 are brought into contact with each other, such as may occur when card 28 is not in the pocket, to establish a closed electrical circuit between the ends 36, 38 of conductor strips 30, 32 respectively. Strips 30 and 32 and plate 34 thus cooperate to provide a card circuit for detecting absence of a card in any one or more of the pockets.

Alarm circuit 16 situated in end cover 14 includes one or more electric cells or batteries 40, chip 42 and buzzer or speaker 44. When terminals 46 and 48 of alarm circuit 16 are electrically connected together, buzzer 44 will sound an alarm. Card circuit conductors 30 and 32 are interconnected to terminals 46 and 48 to make such interconnection when a card is absent from a pocket. Thus, conductor strip 30 is connected at its end 36 directly to terminal 46 of alarm circuit 16 while conductor strip 32 is indirectly connected at its end 38 to alarm circuit terminal 48. More specifically, to control alarm circuit 16 so that an alarm is not given every time strips 30 and 32 are electrically interconnected by a plate 34 (such as by removal of card 28), conductor strip 32 is connected to terminal 48 through series control circuit 50 which prevents alarm circuit 16 from sounding buzzer 44 when circuit 50 is open even though a card 28 is removed.

Detector circuit 50 includes loop-shaped external conductor 52 affixed to the outside of front wall 20 of pocket 54 adjacent end cover 14 and short conducting plate 58 affixed to the outside of the front wall of the adjoining pocket 56. Conductor 52 is interconnected in series between end 38 of strip 32 and alarm circuit terminal 48 and is interrupted by a gap 60 to interrupt electrical communication between strip 32 and terminal 48. Gap 60 may be short-circuited by conductor plate 58 by placing pockets 54 and 56 into overlying relationship, such as by folding cardholder 10 up into a flat packet thereby urging the two front walls of pockets 54 and 56 together. When gap 60 is thus bridged, and a card is absent from any pocket (as indicated by interconnection of strips 30, 32), a circuit is completed between terminals 46, 48 of alarm circuit 16 and the alarm will be sounded.

In operation of cardholder 10, the owner (not shown) requiring use of card 28 opens or unfolds the cardholder 10 and pulls the desired card out of its pocket 12, while the other pockets remain filled with cards. Even if the walls of the empty pocket contact causing conductive connection between conductor strips 30 and 32 by means of the associated plate 34, no alarm will be emitted by alarm circuit 16 due to the open circuit condition of gap 60 in loop-shaped circuit 52 of control circuit 50. Should the owner forget to return card 28 into its pocket and then close up cardholder 10, pockets 54 and 56 will be in overlying relationship such that plate 58 will bridge gap 60 causing alarm circuit 16 to energize buzzer 44 thereby sounding the alarm. The alarm thus emitted reminds the owner to retrieve card 28 and place it back into the empty pocket of the cardholder, thereby opening the closed circuit between terminals 46 and 48 and terminating the alarm.

It will be understood that a card has to be inserted into every pocket, even if it is a blank, to prevent contact between the respective conductor strips 30 and 32 by means of plate 34 and sounding of the alarm when gap 60 is closed by plate 58 such as whenever cardholder 10 is folded up.

Figure 2:
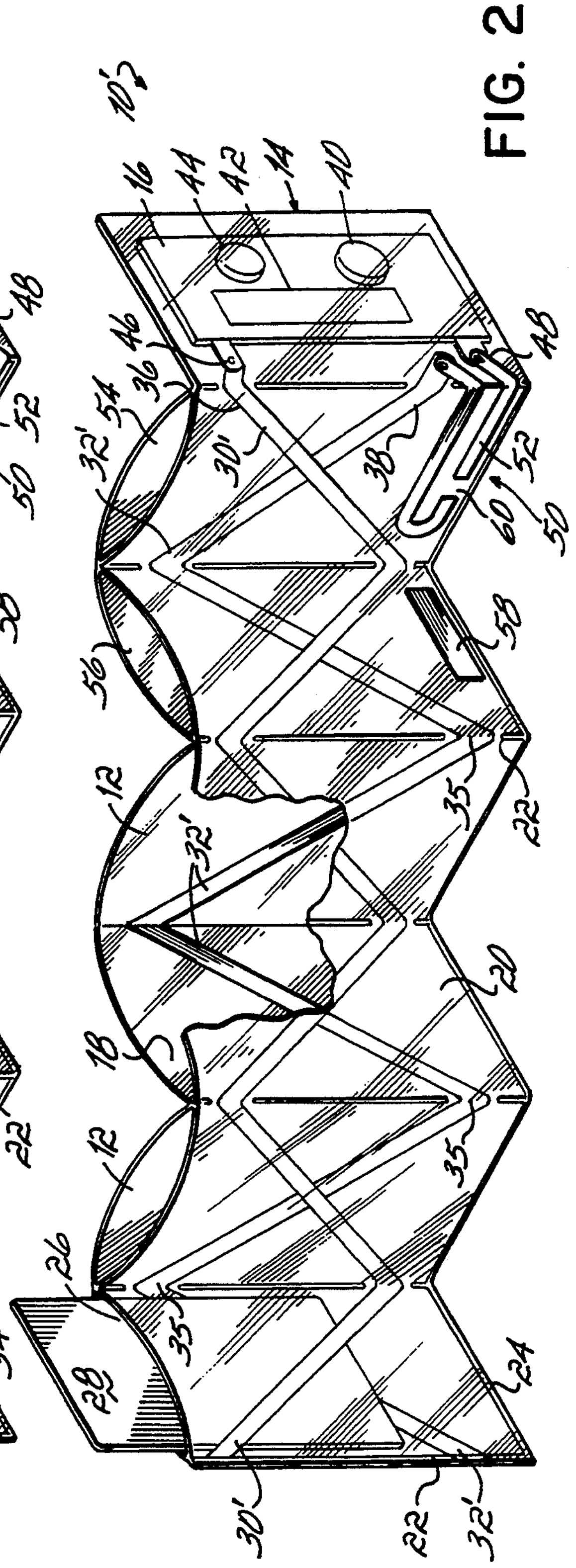
FIG. 2 is a perspective view, partially cut-away, of a second embodiment of a cardholder with the alarm control circuit of FIG. 1.

With reference to FIG. 2, there is illustrated a second embodiment of cardholder 10' which is similar to cardholder 10 of FIG. 1 except that the card circuit of strips 30 and 32 and plate 34 is replaced by a pair of zigzag-shaped conductor strips 30' and 32' attached to the inside of the front and rear walls, respectively, of each pocket such that within each pocket a portion of conductor strip 30' crosses a portion of conductor strip 32' as at 34' to thereby close or complete the card circuit whenever the walls of the pocket are brought together such as due to absence of a card therein. Operation of cardholder 10' of FIG. 2 is identical to that of cardholder 10 described above except that conductor strips 30' and 32' are conductively connected by direct contact between them rather than via a separate conductive plate such as plate 34 of FIG. 1.

Figure 3:
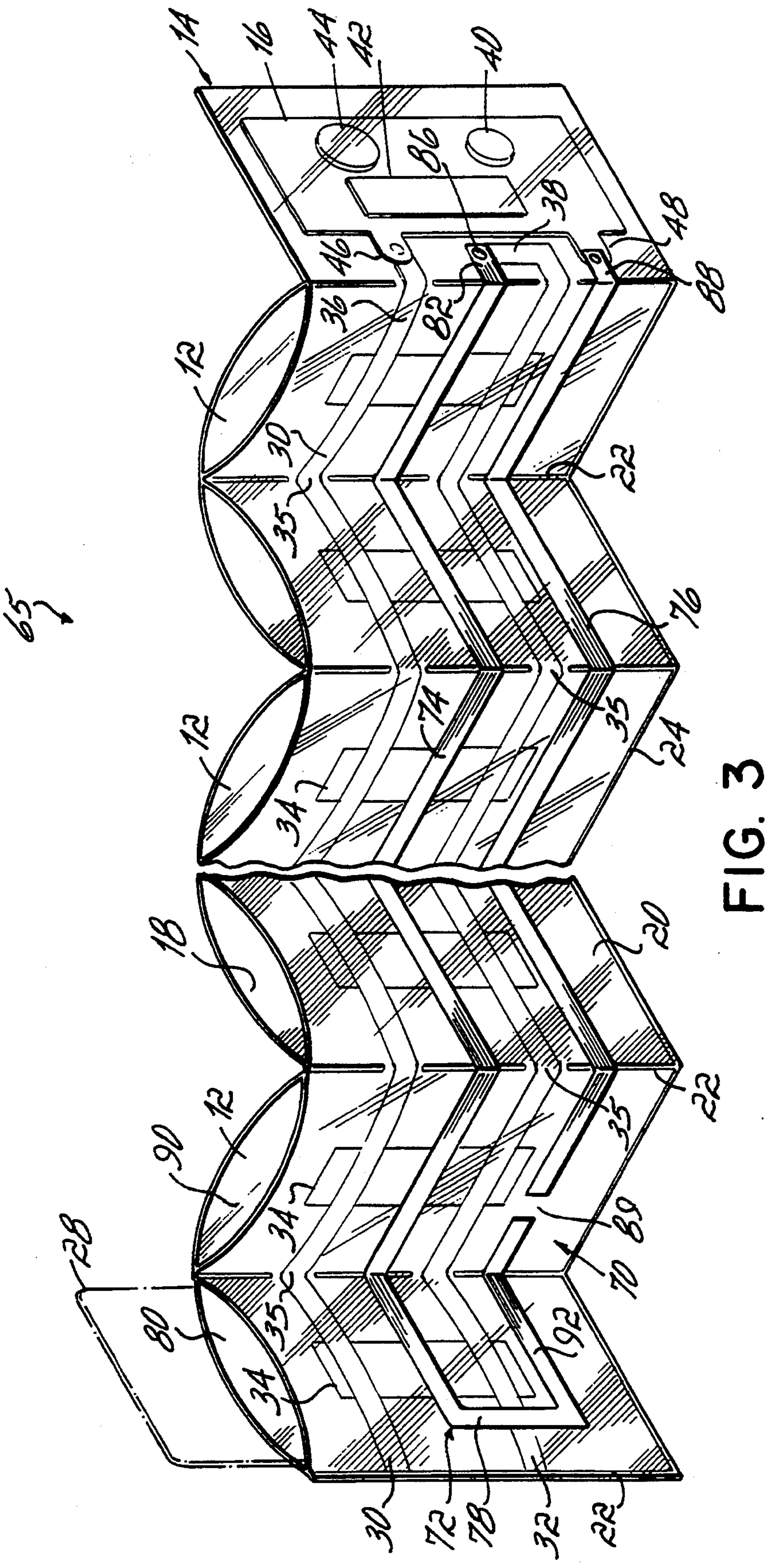
FIG. 3 is a perspective view of a third embodiment of a cardholder with another alarm control circuit in accordance with the principles of the present invention.

FIG. 3 illustrates a still further embodiment of a cardholder 65 similar to cardholder 10 of FIG. 1, but with a modified control circuit 70 as will now be described. More specifically, circuit 70 consists of loop-shaped conductor 72 having a pair of conductive strips 74, 76 extending along the exterior of front strip 20 and thus along the outside wall of all of the pockets 12. Strips 74, 76 are interconnected by strip 78 of conductor 72 on outermost pocket 80. End 82 of strip 74 is connected to end 38 of card circuit conductor strip 32 such as with a rivet 86 or the like while end 88 of strip 76 is similarly connected to terminal 48 of alarm circuit 16. Strip 76 is interrupted as at gap 89 on penultimate pocket 90 and positioned such that a portion 92 of strip 76 on outermost pocket 80 bridges gap 89 when pockets 80 and 90 are placed into overlying relationship. Operation of cardholder 65 of FIG. 3 is otherwise identical with that of the cardholders shown in FIGS. 1 and 2.

Figure 4:
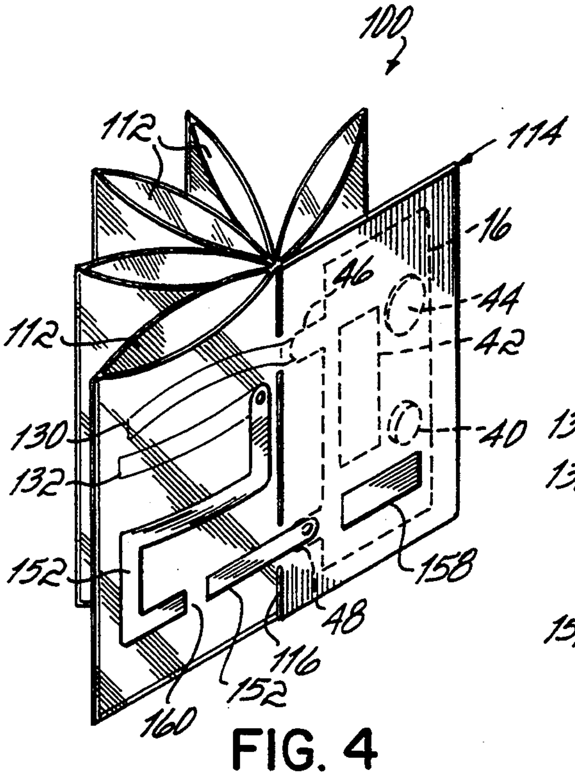
FIG. 4 is a perspective view of a fourth embodiment of a cardholder with yet another alarm control circuit in accordance with the principles of the present invention.
Figure 5:
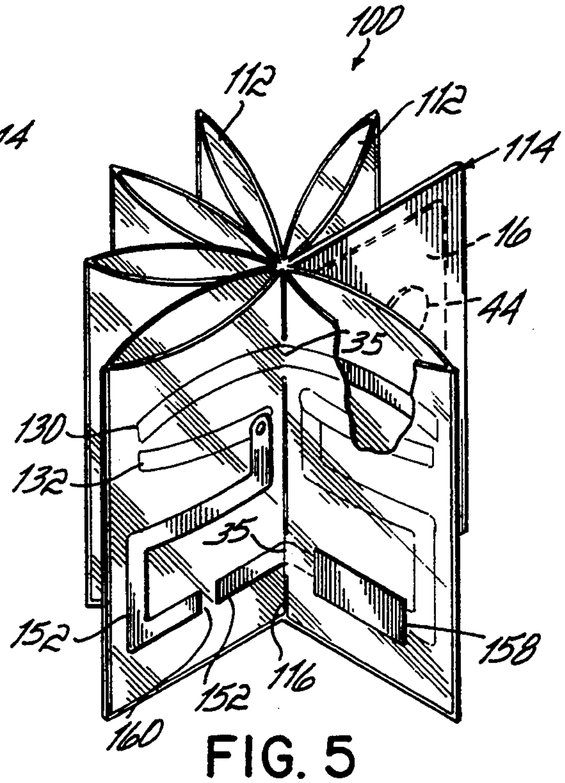
FIG. 5 is another perspective view of the cardholder of FIG. 4.

Turning to FIGS. 4 and 5, there is illustrated a cardholder 100 in book form, including several flexible plastic pockets 112 and cover 114 all joined together along common edge or seam 116. Each pocket 112 is provided with two internal conductor strips 130 and 132 on opposite walls of the pocket to provide a card circuit which indicates absence of a card by direct contact therebetween and an interrupted external loop-shaped conductor 152 to provide part of the control circuit. Conductor strips 130 are each connected to alarm circuit terminal 46 while each conductor strip 132 is connected in series through its associated external control circuit conductor 152 with terminal 48 of alarm circuit 16. Disposed on the exterior of an adjacent (to the right) surface such as the adjacent end cover (see FIG. 4) or each adjacent pocket (see FIG. 5) is a conductive plate-shaped web or conductor 158 which is sized and positioned to electrically close gap 160 of the adjacent conductor 152 when the two adjacent pockets (or the pocket and adjacent end cover) are placed into overlying relationship. Placing an empty pocket in overlying relationship with the right-side adjacent surface, such as by closing of cardholder 100, will complete the circuit between alarm circuit terminals 46 and 48 causing the alarm to be emitted.

Figure 6:
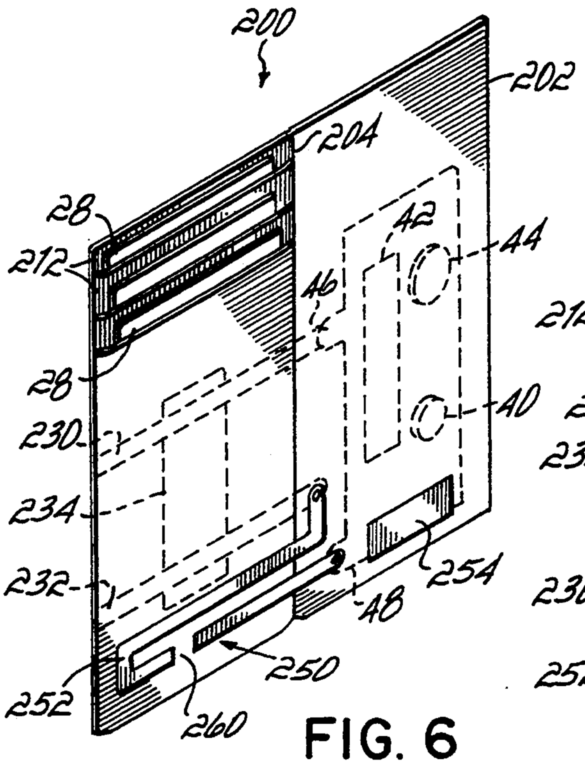
FIG. 6 is a perspective view of a fifth embodiment of a cardholder with an alarm control circuit in accordance with the principles of the present invention.
Figure 7:
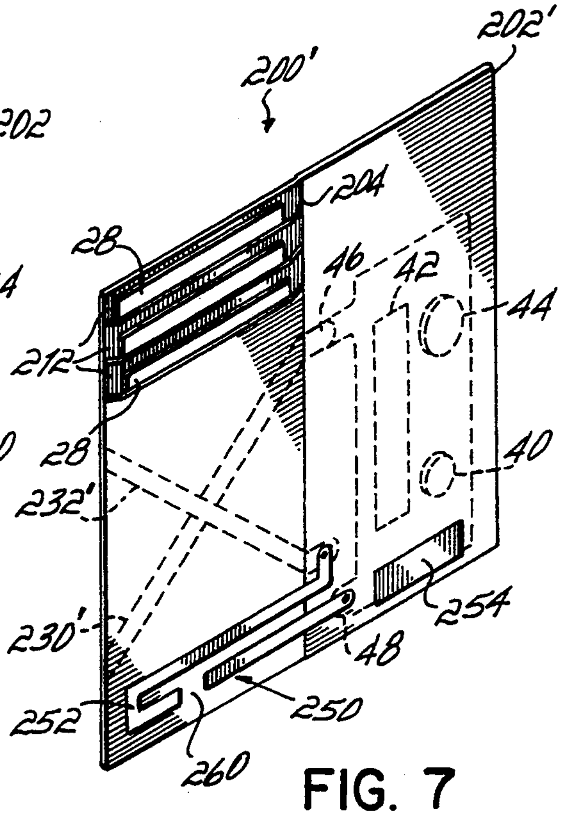
FIG. 7 is a perspective view of a sixth embodiment of a cardholder with the control circuit of FIG. 6.

With reference to FIGS. 6 and 7, there are shown two embodiments of folio-type cardholders 200 and 200', respectively. Each cardholder 200, 200' includes a plurality of overlying pockets 212 and an end cover 202 joined along seam 204 with alarm circuit 16 contained within end cover 202. To detect absence of a card 28, card circuitry like that of FIGS. 1 or 2 are provided. To this end, cardholder 200 is provided with a pair of conductors 230 and 232 which are affixed along one wall through the interior of all pockets 212 and an opposed plate 234 on the interior of the opposite wall of each pocket to electrically interconnect conductors 230 and 232 within a pocket in the absence of a card from that pocket. Similarly, extending along opposite walls through the interior of all of the pockets 212 of cardholder 200' are criss-crossing zigzag internal conductors 230′ and 232′ (FIG. 7) which electrically directly interconnect when a card is not contained in one of the pockets. To control alarm circuit 16, series control circuit 250 is provided by loop-shaped conductor 252 on the outermost or foremost pocket 212 and conductor plate 254 on end cover 202. Conductor 252 is interrupted as at gap 260 which is bridged by plate 254 when pockets 212 and end cover 202 are closed together into overlying relationship to thereby enable alarm circuit 16 if a card is absent from a pocket 212.

Figures 8, 9, 10:
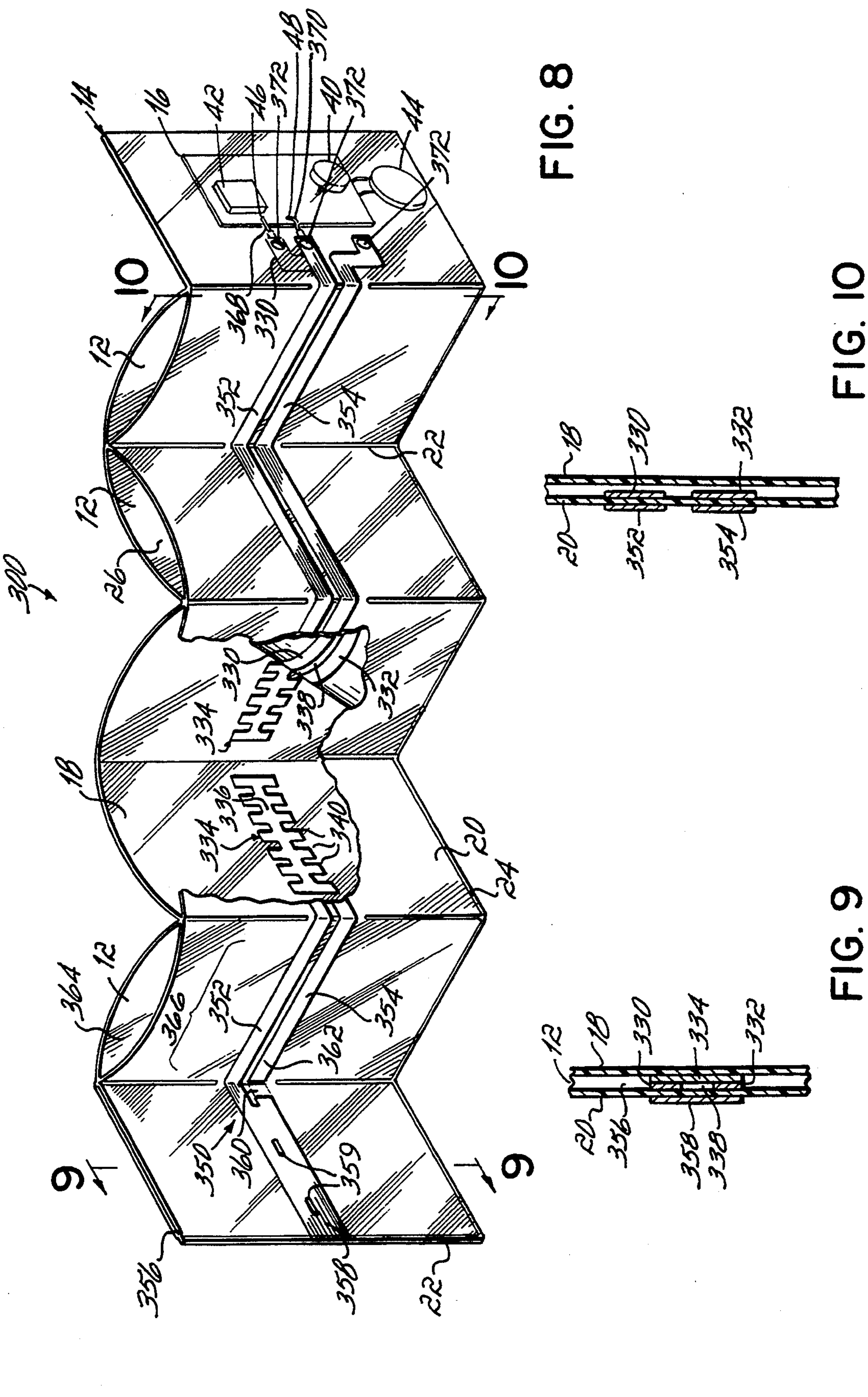
FIG. 8 is a perspective view of a seventh embodiment of a cardholder with an alarm control circuit in accordance with the principles of the present invention.
FIG. 9 is an expanded view of a portion of an empty pocket taken along line 9—9 of FIG. 8.
FIG. 10 is a view taken along line 10—10 of FIG. 8.

Turning to FIGS. 8–10, there is shown a still further embodiment of a cardholder 300 in accordance with the principles of the present invention. Cardholder 300 is similar to the cardholders shown in FIGS. 1, 2 and 3 and operates in similar fashion. To this end, the card circuit of cardholder 300 is similar to the card circuit of FIG. 1 and is provided by a pair of closely spaced strips or conductors 330 and 332 each made of conductive graphite which has been silk-screened or photodeposited to a thickness of 0.08 millimeter (mm) onto one side of 0.12 mm thick PVC strip 20 so as to extend the length of the pockets 12 along the interior thereof (see FIGS. 9 and 10). A plurality of grid-like conductors 334, also of conductive graphite are silk-screened or photodeposited to a thickness of 0.08 mm on 0.12 mm thick PVC strip 18 so as to be positioned, one to a pocket, on the interior wall opposite conductors 330 and 332. Conductors 330 and 332 are electrically interconnected by conductor 334 when a card is absent from a pocket 12 as seen in FIG. 9. Preferably, strips 330 and 332 are each about 7/32″ wide and are spaced apart about 2/32″. Further preferably, each conductor 334 has a longitudinal strip portion 336 about 3/32″ wide extending parallel along the space 338 between conductors 330 and 332, and a plurality (such as seven) 3/16″ width stub fingers 340 extending perpendicular and across conductors 330, 332 to thereby electrically interconnect same. Stub finger 340 may be spaced from each other about $\frac{1}{8}$″.

Control circuit 350 similar to control circuit 70 of FIG. 3 and is provided by silk-screening or photodepositing conductive graphite also to a thickness of 0.08 mm, in a loop shape having a pair of closely spaced strips 352, 354 affixed to the other side of strip 20 so as to extend along the exterior of the pockets between end cover 14 and the outermost pocket 356 (shown closed without a card 28). Strips 352 and 354 are interconnected on pocket 356 by added material 358 bridging the distal ends of strips 352, 354 to define a plate-like web (with small apertures 359) of conductive material on the outside of that pocket. Strip 354 is interrupted by $\frac{1}{4}$″ gap 360 on pocket 356 adjacent seam 22. Gap 360 may be bridged by the portion 362 of strip 354 on penultimate pocket 364 when pocket 364 is placed into overlying relationship with pocket 356. The web of material on pocket 356 may also or alternatively bridge across strips 352, 354 in an area 366 upstream of gap 360 and closer to end cover 14. Strip 330 is connected such as by wire 368 to alarm circuit terminal 46; strip 332 is connected to strip 354 in end cover 14; and strip 352 is connected directly via wire 370 to alarm circuit terminal 48, all with rivets 372, for example. Strips 352, 354 are preferably affixed in overlying relationship with strips 330 and 332 with plastic strip 20 therebetween as seen in FIG. 10 so that there appears to be only one pair of strips as seen in FIG. 8. A piece of nonconductive polypropylene tape (not shown) may be applied over most of the length of strips 352 and 354 leaving exposed a portion of strips 352 and 354 on pockets 356 and 364 and gap 360. When pockets 356 and 364 are placed into overlying relationship, gap 360 and/or strips 350, 352 in area 366 are bridged thereby closing the circuit and enabling alarm circuit 16 if a card is absent from any of the pockets.

Figure 11:
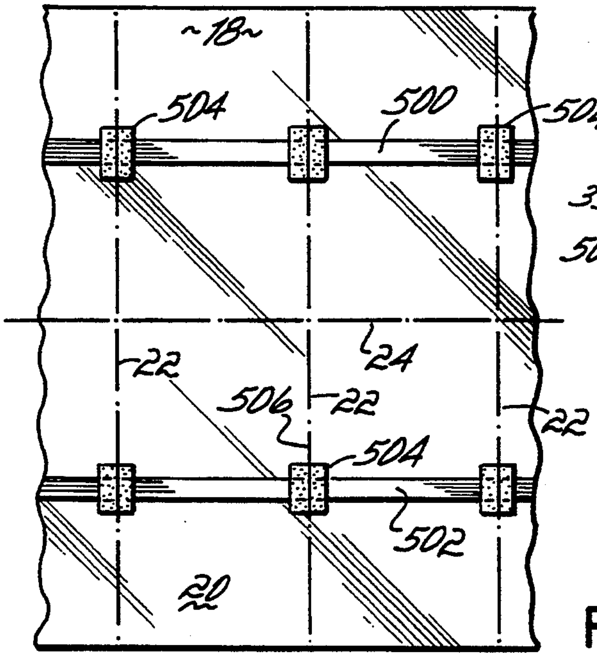
FIG. 11 is a partial top view of a portion of unassembled pockets showing an alternative card circuit.
Figure 12:
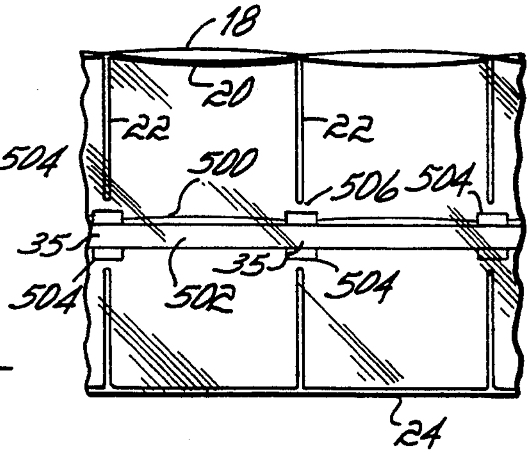
FIG. 12 is a partial side view showing the pockets of FIG. 11 as assembled.

Turning to FIGS. 11 and 12, a version of card circuit similar to that used in the book cardholder 100 is shown for accordion style cardholders 10, 10′ or 300. To this end, only two conductors 500, 502 are used (as in the case of conductors 30′, 32′ of cardholder 10′) wherein they are disposed longitudinally along the inner walls of plastic strips 18 and 20 equidistant from the bottom edge seam 24 (see FIG. 11) so that they are in confronting relationship when the pockets are formed (FIG. 12) to thus provide direct connection therebetween in the absence of a card in the pocket. To prevent such interconnection at the pocket side seams 22, i.e., an electrical short, a piece of polyurethane material or polypropylene tape 504 is applied over conductors 500, 502 in the area 506 of seam 22 as seen in FIG. 11.

While the present invention has been illustrated by the description of alternative embodiments, and while the embodiments have been described in considerable detail, it is not the intention of the applicant to restrict or in any way limit the scope of the appended claims to such detail. Additional advantages and modifications will readily appear to those skilled in the art. For example, while the alarm is described herein as being audible, a visual alarm could be employed. The invention in its broader aspects is therefore not limited to the specific details, representative apparatus and method and illustrative examples shown and described. Accordingly, departures may be made from such details without departing from the scope or spirit of applicant's general inventive concept.

What is claimed is:

1. A cardholder with alarm comprising:

a plurality of interconnected flexible pockets each having an interior for receiving a card and an exterior surface;

card circuit means associated with the interior of each of the pockets for detecting when a card is absent from one of the pockets;

control circuit means disposed on the exterior surface of at least a first and a second of the pockets for indicating when the first and second pockets are in overlying relationship, the control circuit means including a conductor defined by a pair of spaced apart conductive strips disposed along the exterior surface of at least the first and second pockets, the strips being electrically interconnected at an end thereof, one of the strips having a gap at some point therealong on the exterior surface of the first pocket, a portion of that strip being positioned on the second pocket to bridge the gap when the first and second pockets are in overlying relationship; and alarm means responsive to the card circuit means and the control circuit means for providing an alarm when a card is absent from at least one of the pockets and the first and second pockets are in overlying relationship.

2. The cardholder of claim 1, the first and second pockets being adjacent one another.

3. The cardholder of claim 1, the card circuit means including a pair of conductive strips disposed on one interior wall of each pocket and a conductive member disposed on an opposite interior wall of each pocket, whereby a card in one of the pockets separates the conductive member in that pocket from the conductive strips in that pocket, such that the conductive member electrically interconnects the conductive strips within that pocket in the absence of a card in that pocket.

4. The cardholder of claim 3, the conductive member being a plate.

5. The cardholder of claim 3, the conductive member being a grid.

6. The cardholder of claim 1, the card circuit means including a pair of criss-crossed conductive strips disposed on opposite interior walls of each pocket, whereby a card in one of the pockets separates the conductive strips in that pocket such that the conductive strips electrically interconnect within that pocket in the absence of a card in that pocket.

7. The cardholder of claim 1, the card circuit means including a pair of confronting conductive strips disposed on opposite interior walls of each pocket, whereby a card in one of the pockets separates the conductive strips in that pocket such that the conductive strips electrically interconnect within that pocket in the absence of a card in that pocket.

8. The cardholder of claim 7 wherein the pockets are interconnected along seams with the conductive strips of the card circuit means passing through the seams, the cardholder further comprising insulative material between the card circuit means conductive strips within the seams.

9. The cardholder of claim 1, the pockets being interconnected in accordion fashion.

10. The cardholder of claim 1, the pockets being interconnected in book fashion.

11. The cardholder of claim 1, the pockets being supported in folio fashion.

12. A cardholder with alarm comprising:

- a plurality of interconnected pockets, each having an interior for receiving a card and first and second exterior surfaces;
- card circuit means associated with the interior of each of the pockets for detecting when a card is absent from one of the pockets;
- a plurality of control conductors, each control conductor being disposed on the first exterior surface of a respective pocket, each control conductor being interrupted at a gap;
- a plurality of conductive webs, each web being situated on the second exterior surface of a respective pocket, each conductive web positioned to bridge the gap of the control conductor on the first exterior surface of an adjacent pocket when adjacent pockets are in overlying relationship; and
- alarm means responsive to the card circuit means and bridging of the gap of the control conductor of one of the pockets for providing an alarm when a card is absent from that pocket.

13. The cardholder of claim 12, the card circuit means including a pair of conductive strips disposed on one interior wall and a conductive member disposed on an opposite interior wall of each pocket, whereby a card in one of the pockets separates the conductive member in that pocket from the conductive strips in that pocket such that the conductive member electrically interconnects the conductive strips within that pocket in the absence of a card in that pocket.

14. The cardholder of claim 13, the conductive member being a plate.

15. The cardholder of claim 13, the conductive member being a grid.

16. The cardholder of claim 12, the card circuit means including a pair of criss-crossed conductive strips disposed on opposite interior walls of each pocket, whereby a card in one of the pockets separates the conductive strips in that pocket such that the conductive strips electrically interconnect within that pocket in the absence of a card in that pocket.

17. The cardholder of claim 12, the card circuit means including a pair of confronting conductive strips disposed on opposite interior walls of each pocket, whereby a card in one of the pockets separates the conductive strips in that pocket such that the conductive strips electrically interconnect within that pocket in the absence of a card in that pocket.

18. The cardholder of claim 17 wherein the pockets are interconnected along seams with the conductive strips of the card circuit means passing through the seams, the cardholder further comprising insulative material between the card circuit means conductive strips within the seams.

19. The cardholder of claim 12, the pockets being interconnected in accordion fashion.

20. The cardholder of claim 12, the pockets being interconnected in book fashion.

21. The cardholder of claim 12, the pockets being supported in folio fashion.

22. A cardholder with alarm comprising:

- dielectric sheet means sealed at predetermined locations so as to define a plurality of interconnected flexible pockets each having an interior for receiving a card and an exterior surface, the interior of each pocket being defined by opposing front surface portions and the exterior surface of each pocket being defined by respective back surface portions;
- card circuit means defined by conductive material on the opposing front surface portions and associated with the interior of each of the pockets for detecting when a card is absent from one of the pockets;
- control circuit means on at least one of the back surface portions of the sheet means and associated with the exterior surface of at least a first and a second one of the pockets for indicating when the first and second pockets are in overlying relationship; and
- alarm means responsive to the card circuit means and the control circuit means for providing an alarm when a card is absent from at least one of the pockets and the first and second pockets are in overlying relationship.

23. The cardholder of claim 22 the control circuit means including first and second conductors on the back surface portions of the sheet means, the first conductor being disposed on the first pocket and having a gap at some point therealong, the second conductor being disposed on the second pocket and positioned to bridge the gap when the first and second pockets are in overlying relationship.

24. The cardholder of claim 22, the control circuit means including a pair of spaced apart conductive strips on the back surface portions of the sheet means and disposed along the exterior surface of at least the first pocket, the control circuit means further including conductive means on the back surface portions of the sheet means and on the second pocket, the conductive means being positioned to bridge the strips when the first and second pockets are in overlying relationship.

25. The cardholder of claim 22, the first and second pockets being adjacent one another.

26. The cardholder of claim 22, the card circuit means conductive material including a pair of conductive strips disposed on one of the front surface portions of each pocket and a conductive member disposed on the front surface portion of each pocket which opposes said one front surface portion, whereby a card in one of the pockets separates the conductive member in that pocket from the conductive strips in that pocket such that the conductive member electrically interconnects the conductive strips within that pocket in the absence of a card in that pocket.

27. The cardholder of claim 26, the conductive member being a plate.

28. The cardholder of claim 26, the conductive member being a grid.

29. The cardholder of claim 22, the card circuit means conductive material including a pair of criss-crossed conductive strips disposed on respective ones of the opposing front surface portions of each pocket, whereby a card in one of the pockets separates the conductive strips in that pocket such that the conductive strips electrically interconnect within that pocket in the absence of a card in that pocket.

30. The cardholder of claim 22, the card circuit means conductive material including a pair of confronting conductive strips disposed on respective ones of the opposing front surface portions of each pocket, whereby a card in one of the pockets separates the conductive strips in that pocket such that the conductive strips electrically interconnect within that pocket in the absence of a card in that pocket.

31. The cardholder of claim 30 wherein the pockets are interconnected along seams with the conductive strips of the card circuit means passing through the seams, the cardholder further comprising insulative material between the card circuit means conductive strips within the seams.

32. The cardholder of claim 22, the pockets being interconnected in accordion fashion.

33. The cardholder of claim 22, the pockets being interconnected in book fashion.

34. The cardholder of claim 22, the pockets being supported in folio fashion.

35. The cardholder of claim 22, the dielectric sheet means being a dielectric sheet having a front surface and a back surface and being folded such that respective portions of the front surface form said opposing front surface portions of each said pocket.

* * * * *